United States Patent
Arellano

(10) Patent No.: US 9,616,840 B2
(45) Date of Patent: Apr. 11, 2017

(54) INSPECTION WINDOWS FOR CURTAIN SIDE AIRBAG SYSTEMS

(71) Applicant: Toyota Motor Engineering & Manufacturing North America, Inc., Erlanger, KY (US)

(72) Inventor: Nora Arellano, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/826,467

(22) Filed: Aug. 14, 2015

(65) Prior Publication Data

US 2017/0043739 A1 Feb. 16, 2017

(51) Int. Cl.
| | |
|---|---|
| *B60R 21/215* | (2011.01) |
| *B60R 21/214* | (2011.01) |
| *B60R 21/231* | (2011.01) |
| *B60R 21/232* | (2011.01) |
| *B60R 21/237* | (2006.01) |

(52) U.S. Cl.
CPC .......... *B60R 21/215* (2013.01); *B60R 21/214* (2013.01); *B60R 21/232* (2013.01); *B60R 21/237* (2013.01); *B60R 21/23138* (2013.01)

(58) Field of Classification Search
CPC ................ B60R 21/215; B60R 21/23138
USPC .......................................... 280/728.2, 730.2
See application file for complete search history.

(56) References Cited

U.S. PATENT DOCUMENTS

| | | | | |
|---|---|---|---|---|
| 6,022,044 | A * | 2/2000 | Cherry .................... | B60R 21/26 280/728.2 |
| 7,163,231 | B2 | 1/2007 | Kumagai | |
| 7,328,911 | B2 * | 2/2008 | Chapman ................ | B60R 21/20 280/728.2 |
| 7,780,187 | B2 * | 8/2010 | Minamikawa ........ | B60R 21/201 24/458 |
| 7,862,075 | B2 | 1/2011 | Minamikawa | |
| 8,056,924 | B2 | 11/2011 | Hatfield et al. | |
| 8,083,255 | B2 * | 12/2011 | Okimoto ............... | B60R 21/217 280/728.2 |
| 2003/0184057 | A1 * | 10/2003 | Kumagai .............. | B60R 21/213 280/728.3 |
| 2004/0000775 | A1 * | 1/2004 | Henderson ............ | B60R 21/213 280/730.2 |

(Continued)

FOREIGN PATENT DOCUMENTS

| | | |
|---|---|---|
| DE | 102006058484 A1 | 7/2008 |
| GB | 2331491 B | 1/2002 |

*Primary Examiner* — James English
(74) *Attorney, Agent, or Firm* — Christopher G. Darrow; Darrow Mustafa PC

(57) ABSTRACT

Curtain side airbag (CSA) systems are presented. The CSA systems can include a folded curtain configured to be inflated upon detection of an activation event. CSA systems can further include one or more components to protect the folded curtain, such as a sock and a protector. Windows can be defined in the sock and/or protector to allow inspection of a stored curtain airbag. In some arrangements, the protector window and the sock window can be substantially aligned to allow inspection access to at least one curtain feature through the substantially aligned protector window and sock window. Curtain features can include fold configurations of the curtain airbag or other visual or physical markings.

12 Claims, 5 Drawing Sheets

(56) References Cited

U.S. PATENT DOCUMENTS

| | | | |
|---|---|---|---|
| 2007/0126214 A1* | 6/2007 | Quach | B60R 21/213 |
| | | | 280/730.2 |
| 2009/0273167 A1 | 11/2009 | Katagiri | |
| 2009/0278336 A1* | 11/2009 | Minamikawa | B60R 21/213 |
| | | | 280/728.2 |
| 2011/0042923 A1* | 2/2011 | Hatfield | B60R 21/201 |
| | | | 280/730.2 |
| 2011/0175333 A1* | 7/2011 | Mitchell | B60R 21/201 |
| | | | 280/728.2 |
| 2014/0054879 A1* | 2/2014 | Taguchi | B60R 21/213 |
| | | | 280/730.2 |

* cited by examiner

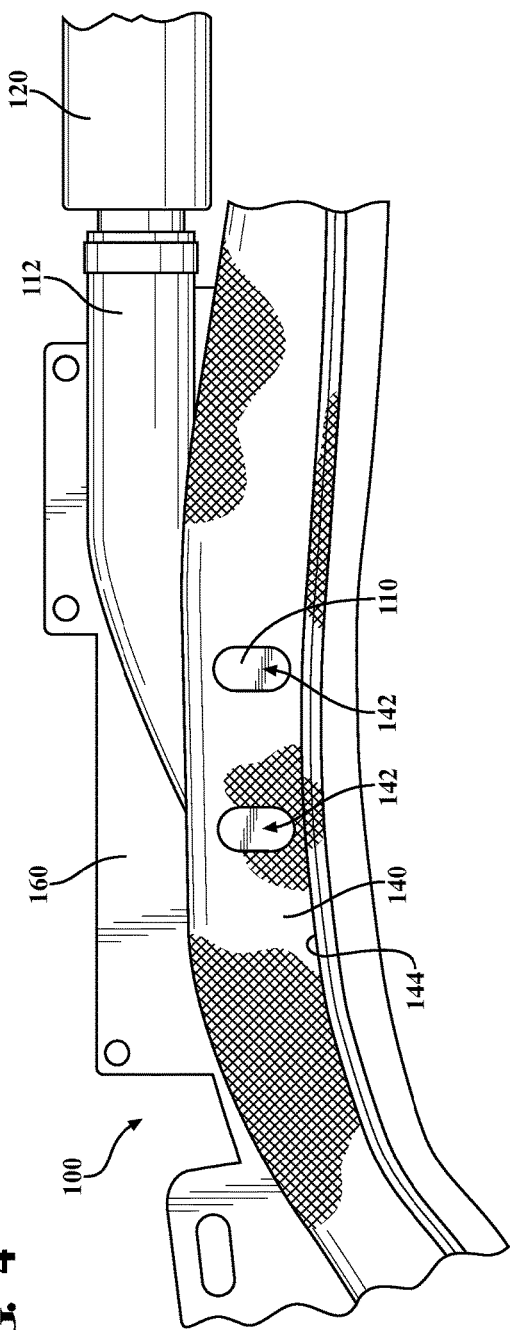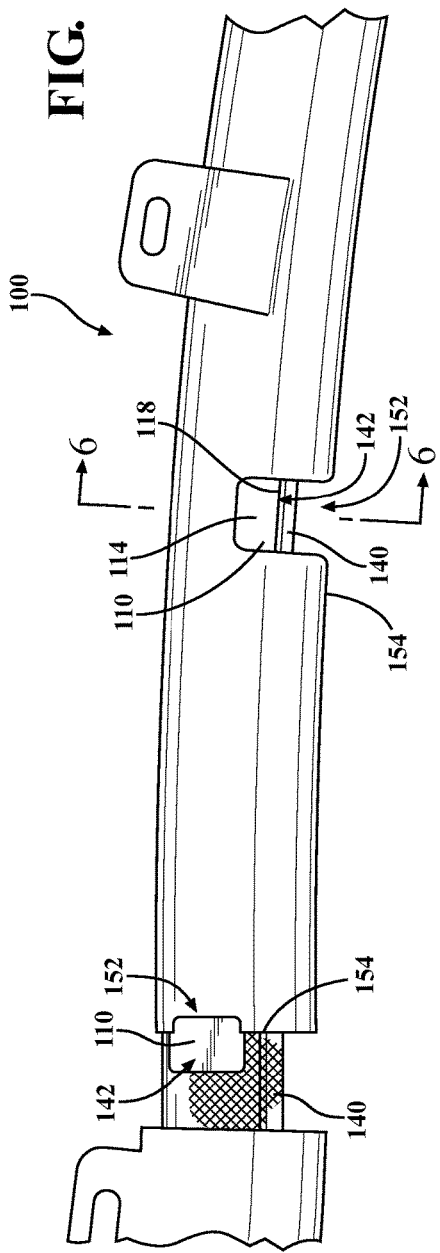

INSPECTION WINDOWS FOR CURTAIN SIDE AIRBAG SYSTEMS

FIELD

The present disclosure relates in general to airbags for vehicles, and more particularly, to the inspection of airbags.

BACKGROUND

Modern vehicles, such as passenger and commercial vehicles, have various safety systems. For instance, some safety systems include an airbag. An airbag is deployed when it is rapidly filled with a fluid supplied by an inflator upon detection of an activation event. The airbag can protect occupants by providing a relatively soft surface against which a portion of a passenger's body may come into contact and/or by preventing a portion of the passenger's body from impacting a relatively hard surface within the vehicle. In some instances, a curtain side airbag (CSA) system can provide protection for occupants near a side of a vehicle. For example, the curtain side airbag may be located near a headliner of the vehicle to protect a head of the occupant during an accident. The curtain side airbag can include a folded curtain and an inflator. CSA systems can include a variety of components designed to position, retain, orient, and/or protect the CSA system. The configuration of the curtain within a CSA system can determine deployment trajectory during an activation event.

SUMMARY

In one respect, the present disclosure is directed to a curtain side airbag system. The curtain side airbag system can include an inflatable curtain and a sock operatively connected to the inflatable curtain. The sock can define a sock window. The system can also include a protector operatively connected to the inflatable curtain, and the protector can define a protector window. The protector window can be substantially aligned with the sock window such that inspection access to at least one curtain feature is allowed through the substantially aligned protector window and the sock window.

In another respect, the present disclosure is directed to a curtain side airbag system. The curtain side airbag system can include an inflatable curtain with a roll plus one fold configuration. The system can further include an inflator that is connected in fluid communication with the inflatable curtain. The inflator can be configured to selectively introduce a gas into the inflatable curtain. The system can further include a sock operatively connected to the inflatable curtain. The sock can include a sock seam having overlapping portions stitched together. The sock can further define a sock window. The system can include a protector operatively connected to the inflatable curtain, and the protector can define a protector window. The protector window can be substantially aligned with the sock window such that inspection access to a fold feature of the inflatable curtain is allowed through the substantially aligned protector window and the sock window.

In yet another respect, the present disclosure is directed to a method for providing a curtain side airbag system having a folded curtain configured for deployment. The method can include positioning a sock around the folded curtain, wherein the sock can define a sock window. The method can include operatively connecting a protector to the fold curtain, wherein the protector can define a protector window. The protector window can be substantially aligned with the sock window such that inspection access to a curtain feature of the folded curtain is allowed through the substantially aligned protector window and the sock window.

Variations in these and other aspects, features, elements, implementations, and embodiments of the methods, systems, and apparatuses are disclosed herein are described in further detail hereafter.

BRIEF DESCRIPTION OF THE DRAWINGS

FIG. 4 is a close-up view of a portion of the example CSA system of FIG. 2.

FIG. 5 is a close-up view of a portion of the example CSA system of FIG. 3.

DETAILED DESCRIPTION

Figure 1:
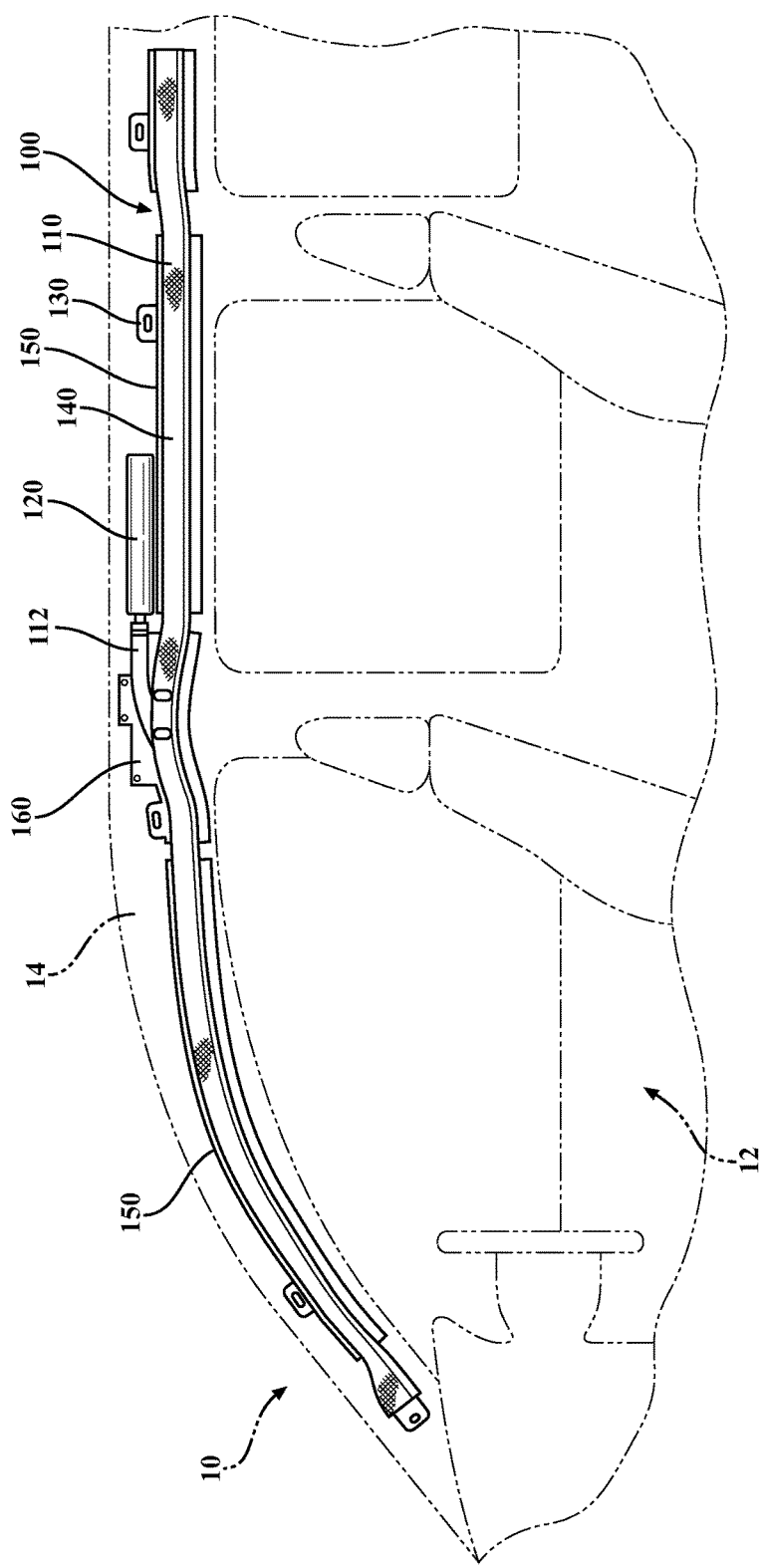
FIG. 1 is a view of a portion of a vehicle including one example of a curtain side airbag (CSA) system.

Arrangements described herein relate to curtain side airbag (CSA) systems for vehicles. In one or more arrangements, a CSA system can include a folded curtain airbag configured to deploy within a vehicle in response to the detection of an activation event. The CSA system can also include a protective sock. The sock can be positioned to cover at least a portion of the curtain. In one or more arrangements, the CSA system can include a protector. The protector can extend nearby the sock and/or curtain to prevent the curtain and/or the sock from coming into physical contact with surrounding components. The sock and the protector can include one or more windows. The sock widows and the protector windows can be substantially aligned to allow for inspection of curtain features through the substantially aligned windows. The curtain features can include fold creases and visual markings, for example. The present detailed description relates to systems, methods, and apparatuses that incorporate such features. In at least some instances, such systems, methods, and apparatuses can allow for inspection access to the folded curtain within the CSA system and can facilitate the inspection process.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, a view of a portion of a vehicle 10 including one example of a curtain side airbag (CSA) 100 system is shown.

It will be understood that it is not necessary for the vehicle 10 to have all of the elements shown in FIG. 1 or described herein. The vehicle 10 can have any combination of the various elements shown in FIG. 1. In one or more arrangements, the vehicle 10 can include one or more elements in addition to or as an alternative to one or more of the various elements shown in the FIG. 1.

As used herein, "vehicle" means any form of motorized transport. In one or more implementations, the vehicle 10 can be an automobile. While arrangements will be described herein with respect to automobiles, it will be understood that embodiments are not limited to automobiles. In some implementations, the vehicle 10 can be a watercraft, an aircraft, a space craft, or any other form of motorized transport. In some implementations, arrangements described herein can be used in connection with non-motorized forms of transport. The vehicle 10 can define an interior 12. The interior 12 can include an inside portion of the vehicle 10 in which occupants or cargo can be transported. The interior 12 of the vehicle 10 can be directly or indirectly defined, at least in part, by one or more vehicle body structures. For example, a vehicle body structure can include a roof rail 14 extending along a length of the interior 12. In some instances, the roof rail 14 can extend generally between a roof portion of the vehicle 10 and a lateral side portion of the vehicle 10. The roof rail 14 can extend above one or more doors and/or windows of the vehicle.

The vehicle 10 can include a CSA 100. With reference to FIGS. 1-7, different views of an example CSA 100 are shown. Some of the various possible elements of the CSA 100 are shown in the Figures and will now be described. It will be understood that it is not necessary for the CSA 100 to have all of the elements shown in the Figures or described herein. The CSA 100 can have any combination of the various elements shown in the Figures. In one or more arrangements, the CSA 100 can include one or more elements in addition to or as an alternative to one or more of the various elements shown in the Figures. In some arrangements, the CSA 100 can include a curtain 110 and an inflator 120.

As used herein, the term "curtain side airbag" or "CSA" can include any inflatable airbag or system configured to provide cushioning near a lateral side of an interior of a vehicle. The CSA can be located and/or positioned in any suitable location within the vehicle 10. For example, in one or more arrangements, the CSA 100 can be positioned within the vehicle 10 at or near the roof rail 14.

In one or more embodiments, the curtain 110 can be configured to transition between a deflated folded condition and an inflated deployed condition. For example, the curtain 110 can be configured to receive a quantity of fluid from the inflator 120 upon detection of an activation event to deploy from a folded condition. As used herein, the term "activation event" can be any event in which it is desired for an airbag assembly to deploy. Some examples of activation events include a collision involving the vehicle 10, a predetermined amount of deformation of a portion of a body of the vehicle 10, sudden changes in measured acceleration or deceleration of the vehicle 10 or occupants, rollover conditions, and/or vehicle component failure. One or more automotive systems can send signals to an airbag assembly upon the sensing of an activation event. Responsive to receiving such signals, the airbag can be deployed.

The inflator 120 can have any suitable configuration. In some arrangements, the inflator 120 can be a stored gas type. In such case, the inflator 120 can store a compressed gas that can be discharged into curtain 110 during an activation event. Furthermore, the inflator 120 can be a pyrotechnical type. In such cases, the inflator 120 can use combustion to generate gas from a propellant. In some arrangements, the inflator 120 can be combination of a pyrotechnical and stored gas type. The inflator 120 can be any suitable type of inflator, now known or later developed.

The inflator 120 can be connected in fluid communication with the curtain 110. Such a connection can be direct or indirect (e.g., using one or more fluid conduits, fittings, connectors, etc.). In one or more arrangements, the inflator 120 can introduce gas to the curtain 110 via an inlet 112. While the Figures show one inflator 120 and one corresponding inlet 112, it will be appreciated that there can be other suitable configurations for the CSA 100. For example, two or more inflators 120 can be utilized. Additionally or alternatively, two or more inlets 112 can be used for an associated inflator 120.

The CSA 100 can be operatively connected to the vehicle 10 in any suitable manner. As used herein, the term "operatively connected" can include direct and indirect connections, including connections without direct physical contact. In one or more arrangements, the CSA 100 can be operatively connected to the roof rail 14 of the vehicle 10. For example, the CSA 100 can include one or more anchors 130. The anchors 130 can be configured to operatively connect the CSA 100 and the roof rail 14 by any suitable attachment method. For instance, the anchors 130 of the CSA 100 can be operatively connected to the roof rail 14 by one or more fasteners, one or more forms of mechanical engagement, one or more adhesives, one or more forms of welding, and/or one or more forms of brazing, just to name a few possibilities.

In one or more arrangements, the CSA 100 can include a sock 140. As used herein, the term "sock" can include any component configured to substantially cover at least a portion of the curtain 110 when the CSA 100 is in a folded condition. As used herein, the term "substantially" includes exactly the term it modifies and slight variations therefrom. Thus, "substantially cover" as used the sock 140 can include any arrangements wherein at least a portion of the sock 140 extends entirely around or around a majority of at least a portion of the curtain 110. The sock 140 can protect the curtain 110 from direct physical contact with other vehicle components. In one or more arrangements, the sock 140 can retain the curtain 110 in a folded condition. For example, the sock 140 can be configured to extend around, and retain in a particular configuration, a folded curtain 110 of the CSA 100. In one or more arrangements, the sock 140 can be configured to extend along substantially the entire length of the curtain 110. Alternatively, the sock 140 can extend along a portion of the length of the curtain 110.

In one or more arrangements, the CSA 100 can include a plurality of socks 140. In such case, the plurality of socks 140 can extend along at least a portion of the length of the curtain 110. In such case, the plurality of socks 140 can be distributed in any suitable manner along the length of the curtain 110. In some instances, there may be a spacing between the socks 140. In one or more arrangements, the plurality of socks 140 can extend along substantially the entire length of the curtain 110. In such case, the neighboring socks 140 can abut each other, or they can overlap each other. In some instances, at least some of the neighboring socks 140 can be attached to each other.

The sock 140 can be made of any suitable material. Non-limiting examples can include natural fabrics and/or synthetic fabrics. In one or more arrangements, such fabrics can be flexible. The sock 140 can be a substantially rigid structure. Alternatively the sock 140 can be a non-rigid and/or flexible structure. In one or more arrangements, the sock 140 can be formed from a fabric and sewn along one or more seams 144 (see FIGS. 4, 6 and 7). Such seams 144 can be formed by touching (e.g., abutting, overlapping, etc.) portions of the fabric. In one or more arrangements, the sock 140 can also be constructed as a continuous piece of fabric, such that the sock 140 does not include seams.

The sock 140 can have any suitable shape. In one or more arrangements, the sock 140 can have a substantially tubular shape. The sock 140 can be sized, shaped and/or otherwise configured to receive at least a portion of a folded curtain 110.

In some arrangements, the sock 140 can be operatively connected to the curtain 110 in any suitable manner. For example, the sock 140 can be operatively connected to the curtain 110 by one or more fasteners, one or more forms of mechanical engagement, and/or one or more adhesives, just to name a few possibilities. In one or more arrangements, the sock 140 can be operatively connected to the curtain 110 via an interference fit and/or frictional relationship. For example, the sock 140 can contact the curtain 110 directly and can be held in place by frictional forces. When in the curtain 110 is in a folded position it may have a natural tendency to move toward an unfolded condition. In some arrangements, the sock 140 can retain the curtain 110 in a folded position. Alternatively or additionally, the sock 140 can be operatively connected to the curtain 110 via friction from forces created by the curtain 110 being biased away from its folded position. In one or more arrangements, the sock 140 can be fastened directly to the curtain 110. For example, the sock 140 can be sewn to the curtain 110 at one or more locations. In some arrangements, the sock 140 can be operatively connected to one or more of the anchors 130.

In one or more arrangements, the sock 140 can be configured to break, rip, tear, or otherwise fail when the curtain 110 is deployed. For instance, the material of the sock 140 can allow for the deploying curtain 110 to rip through the sock 140. In some arrangements, the sock 140 can fail at the seam 144 during deployment of the curtain 110. In one or more arrangements, the sock 140 can include one or more features to facilitate its ripping or tearing during deployment of the curtain 110. For instance, the sock 140 can include one or more reduced strength areas (e.g. a perforated line or shape formed in the sock 140).

Figure 2:
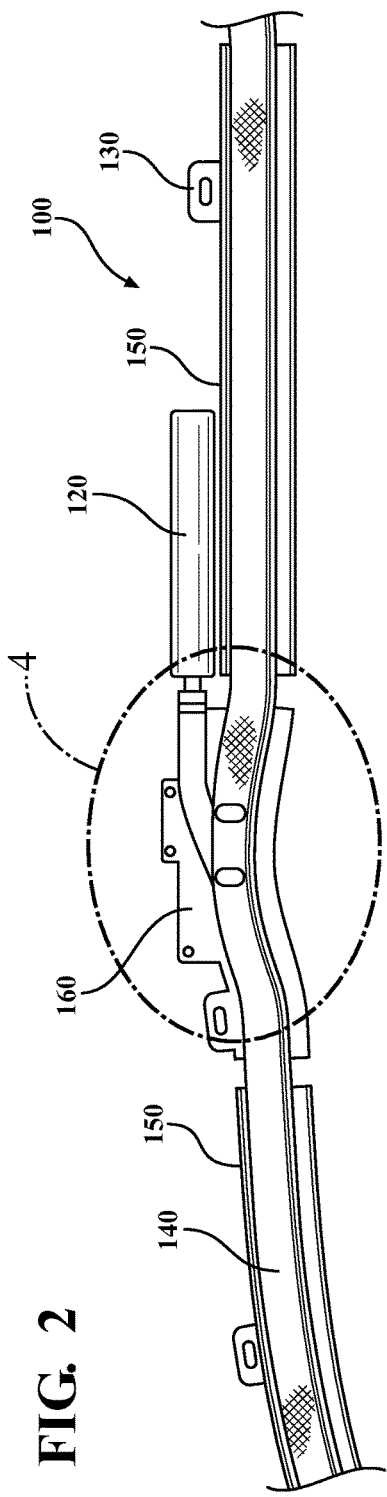
FIG. 2 is a first view of a portion of an example CSA system.
Figure 3:
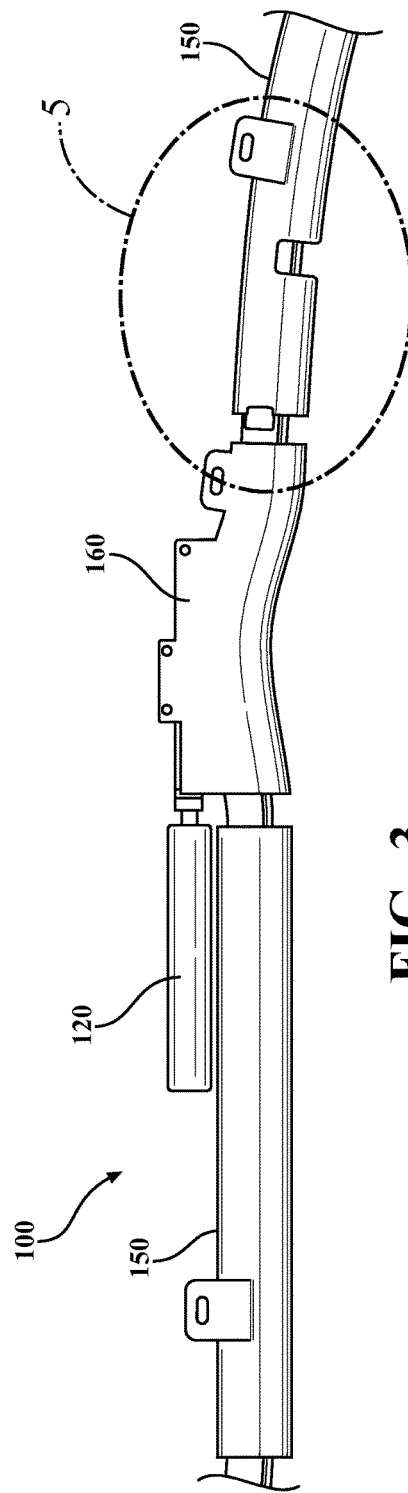
FIG. 3 is a second view of a portion of the example CSA system, wherein the second view is opposite to the first view.

In one or more arrangements, the CSA 100 can include one or more protectors 150. The protector(s) 150 can include any structure that shields, spaces, locates, and/or protects one or more components of the CSA 100. For instance, the protector 150 can physically protect the curtain 110 and/or sock 140 from direct contact with other vehicle components during installation or vehicle operation. In one or more arrangements, the protector 150 can be configured to cover a portion of the curtain 110 and/or sock 140. Referring to FIGS. 2 and 3, the CSA 100 can be described as having an interior-facing side (shown in FIG. 2) and an exterior-facing side (shown in FIG. 3). In this context, the terms "interior" and "exterior" are intended to indicate the portion of the vehicle 10 that the side faces. However, these terms are merely used for convenience and are not intended to be limiting. In one or more arrangements, the protector 150 can extend around and cover at least one or more portions of the exterior-facing side of the curtain 110.

The one or more protectors 150 can be routed, positioned, located, and/or operatively connected within the CSA 100 in any suitable manner. For instance, the protector 150 can be routed, positioned, located, and/or operatively connected based on one or more factors, including, for example, safety, design, space, and/or material considerations or constraints. The protector 150 can have any suitable cross-sectional shape. Furthermore, the protector 150 can be made of any suitable material. Non-limiting examples of suitable materials can include polymers and metals (e.g. steel or aluminum). The protector 150 can be made of a rigid material or of a flexible material.

The protector 150 can be operatively connected to the curtain 110, the sock 140, and/or the inflator 120. The protector 150 can be operatively connected to one or more of these components in any suitable manner. For example, the protector 150 can be operatively connected to one or more components by one or more fasteners, one or more forms of mechanical engagement, and/or one or more adhesives. In some arrangements, the protector 150 can be operatively connected to the sock 140 and/or the curtain 110 via one or more straps and/or tape extending around the components. The protector 150 can include, or can be operatively connected to, one or more anchors 130.

The curtain 110 can have any suitable configuration. For instance, the curtain 110 can be shaped, sized, positioned, and/or connected based on one or more factors, including, for example, safety, design, space, and/or material considerations or constraints. In one or more arrangements, the curtain 110 can be sized based on a desired coverage area during deployment. For example, the curtain 110 can be sized to extend along at least a portion of a side of the interior 12.

In one or more arrangements, the curtain 110 can be folded in any suitable manner. As used herein, "folded" or "fold" in reference to the curtain 110 can include any arrangement of the curtain 110 during a stored condition (e.g., the deflated folded condition). For example, the curtain 110 can be folded to achieve desired deployment characteristics. In some arrangements, the curtain 110 can be folded to achieve a particular deployment trajectory within the interior 12 of the vehicle 10. The pattern of folding of the curtain 110 can influence the deployment of curtain 110 as air or other fluid is rapidly introduced into curtain 110. For example, the curtain 110 can be roll-folded, which can include being rolled upon itself so as to have a substantially spiral shaped cross-sectional configuration. Other fold patterns can be used. For example, the curtain 110 can be folded using an accordion fold, wrap fold, and/or any combinations thereof.

Figure 6:
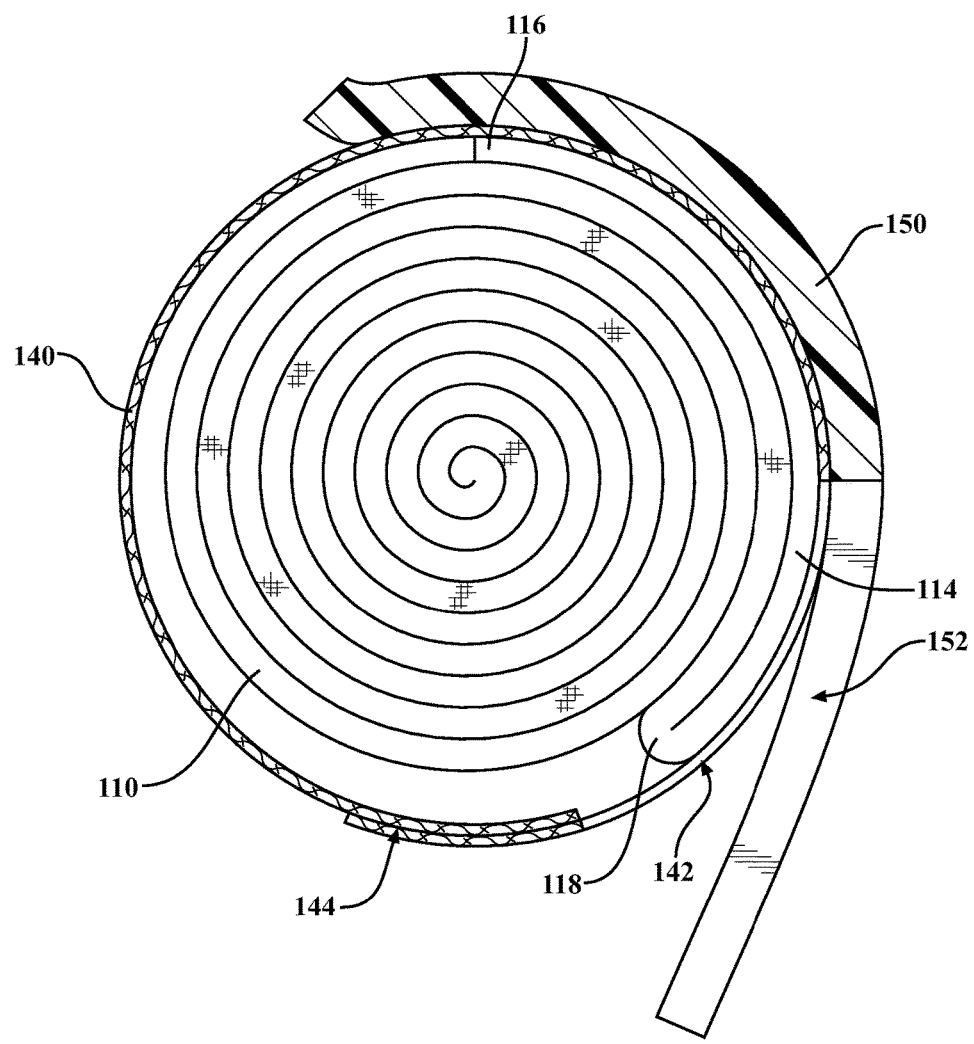
FIG. 6 is a partial cross-sectional view of one arrangement of the example CSA system of FIG. 5, viewed along line 6-6.
Figure 7:
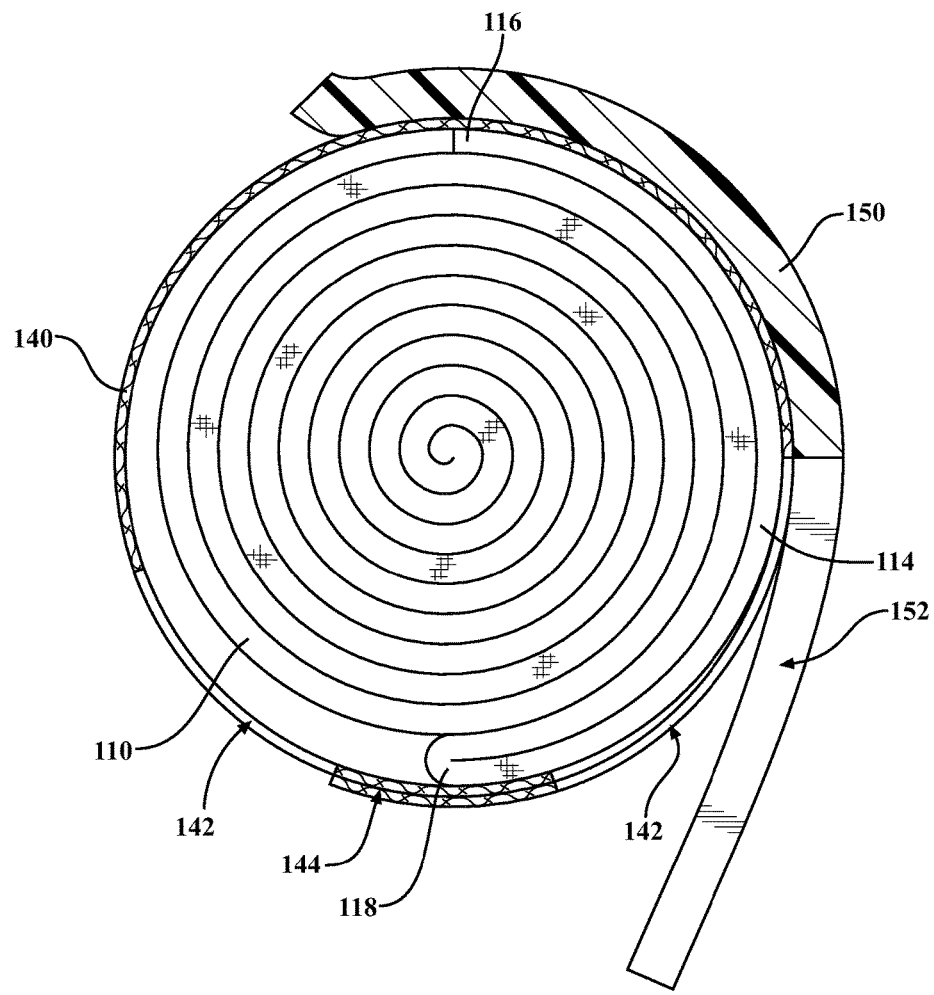
FIG. 7 is a cross-sectional view of another arrangement of the example CSA.

In one or more arrangements, the curtain 110 can be folded using a "roll plus one" or "+1" fold. As used herein, "roll plus one" or "+1" can include patterns in which the curtain 110 is roll folded followed by a single unidirectional pleat fold. As shown in FIGS. 6 and 7, the plus one fold can have a plus one fold 114 extend between a fold crease 118 and a fold end 116. As used herein, "fold crease" can include any transition of a fold pattern of a curtain airbag. For example, the fold crease 118 can be the transition between a rolled portion of the curtain 110 and the plus one fold 114. In one or more arrangements, the deployment trajectory of the curtain 110 can depend on the orientation, size, and/or position of the plus one fold 114, fold start 116, and/or fold crease 118. For example, a deploying curtain 110 can have an initial trajectory generally in a direction that the plus one fold 114 faces (e.g., to the right in FIG. 6). In some arrangements, the curtain 110 can be folded using other fold configurations, such as a roll plus two fold configuration and/or a "z" fold configuration.

In one or more arrangements, the sock 140 and/or the protector 150 can have windows defined therein. As used herein, "window" can include any feature of the sock 140 and/or protector 150 that allows for visual or physical inspection of components covered by the sock 140 and/or protector 150. For example, windows can include apertures, slots, and/or transparent portions in the sock 140 and/or the protector 150. The windows can allow for inspection access to one or more curtain features of curtain 110. As used herein, "curtain features" can include any visual or physical characteristic of the curtain 110. For example, curtain features can include visual markings such as lines, symbols, or other markings on the curtain 110. Furthermore, curtain features can include physical characteristics such as the start or end point of a fold in the curtain 110. The term "inspection access" can include any visual or physical inspection capability for the one or more curtain features. For example, inspection access can include any configuration in which an operator can visually identify or locate one or more curtain features. Furthermore, inspection access can include any configuration in which inspection via a measurement tool is allowed. For example, windows can provide a distance measuring instrument, such as a scale or calipers, access to measure attributes of at least one curtain feature. The measurement tool or other inspection tool may or may not directly contact the curtain 110. The inspection access can allow an operator to determine proper configuration of the CSA 100. For example, the operator can determine if one or more curtain features are positioned and/or oriented within the CSA 100 correctly relative to a specification or an engineering drawing.

In one or more arrangements, one or more sock windows 142 can be defined in the sock 140 of the CSA 100. Referring to FIGS. 4 and 5, the sock windows 142 can be defined in an interior-facing side and/or an exterior-facing side of the sock 140. For example, as shown in FIGS. 2 and 4, the sock windows 142 can be defined in an interior-facing side of the sock 140 at a location near a bracket 160. In one or more arrangements, the sock window(s) 142 can be defined in an exterior-facing side of the sock 140, as shown in FIGS. 3 and 5. Thus, the sock window(s) 142 can allow inspection access to the curtain 110 from an interior-facing side and/or an exterior-facing side of the CSA 100.

The sock window(s) 142 can have any suitable configuration. For instance, the sock window(s) 142 can be shaped, sized, and/or positioned based on one or more factors, including, for example, the protection of the curtain 110, the strength of the sock 140, the location of features to be inspected on curtain 110, material considerations or constraints, and/or the design of sock 140. In one or more arrangements, the sock windows 142 can have a substantially circular, substantially oval, substantially rectangular, substantially triangular, or substantially polygonal cross-sectional shape, or any combination thereof. FIG. 4 shows an example in which the sock windows 142 have a substantially obround shape. Further, FIG. 5 partially shows an example in which the sock windows 142 have substantially rectangular shapes.

The sock window(s) 142 can be distributed on the sock 140 in any suitable manner. When a plurality of sock window(s) 142 are provided, the sock window(s) 142 can be substantially identical to each other at least in terms of size, shape, and/or configuration. However, in one or more arrangements, one or more of the sock window(s) 142 can be different from the other sock window(s) 142 in one or more respects.

In one or more arrangements, one or more protector windows 152 can be defined in the protector 150 of the CSA 100, as is shown in FIGS. 5-7. The protector window(s) 152 can have any suitable configuration. For instance, the protector window(s) 152 can be shaped, sized, and/or positioned based on one or more factors, including, for example, the protection of the curtain 110 and/or sock 140, the strength of the protector 150, the location of features to be inspected on curtain 110 and/or sock 140, material considerations or constraints, and/or the design of the protector 150. In one or more arrangements, the protector window 152 can be a slot, indentation, cutout and/or recess.

The protector window(s) 152 can be provided in any suitable location on the protector 150. In one or more arrangements, the protector window(s) 152 can be defined in an edge portion 154 of the protector 150. For instance, the protector window 152 can be a slot extending from a bottom and/or side edge, as shown in FIG. 5. The terms "bottom" and "side" are used for convenience with reference to the orientation of the components in the Figures, but it will be understood that these terms are not intended to be limiting. Indeed, depending on the orientation of the CSA 100, the bottom or side may actually be located at other relative positions. The protector window(s) 152 can have a substantially circular, substantially oval, substantially rectangular, substantially triangular, or substantially polygonal shape, or any combination thereof. For example, the protector windows 152 can have a rounded rectangular shape, as shown in FIG. 5. In some arrangements, the protector windows 152 can be apertures defined in the protector 150. The apertures can have a substantially circular, substantially oval, substantially rectangular, substantially triangular, or substantially polygonal cross-sectional shape, and/or any combination thereof. The protector window(s) 152 can be distributed on the protector 150 in any suitable manner. When a plurality of protector window(s) 152 are provided, the protector window(s) 152 can be substantially identical to each other at least in terms of size, shape, and/or configuration. However, in one or more arrangements, one or more of the protector window(s) 152 can be different from the other protector window(s) 152 in one or more respects.

In one or more arrangements, the protector window(s) 152 can be substantially identical to the sock window(s) 142. In one or more arrangements, the protector window(s) 152 can be different than the sock window(s) 142 in one or more respects, including, for example, size and/or shape. In one or more arrangements, the quantity of protector window(s) 152 can be the same as the quantity of sock window(s) 142. In one or more arrangements, the quantity of protector window(s) 152 can be different than the quantity of sock window(s) 142.

In one or more arrangements, the CSA 100 can be configured and/or arranged such that at least one protector window 152 is substantially aligned with a sock window 142. As used herein, "substantially aligned" means that a protector window at least partially overlaps a portion of a sock window such that inspection access to a curtain is allowed. For example, at least a portion of the protector window 152 can extend over at least a portion of the sock window 142 to allow visual access to the curtain 110. In some arrangements, the overlapping can allow a measurement instrument access to portions of the curtain 110.

Referring to FIGS. 6 and 7, example cross sectional views of the CSA 100 are shown. For example, FIG. 6 shows a cross section of the CSA 100 viewed along line 6-6 of FIG. 5. In one or more arrangements, the curtain 110 can have a roll plus one fold configuration. For example, the curtain 110 can include plus one fold 114 extending between the fold start 116 and the fold crease 118. The sock 140 is shown as extending around portions of the curtain 110. In one or more arrangements, the sock 140 can extend around the curtain 110 and can be sewn at the seam 144. FIG. 6 also shows the protector 150. In one or more arrangements, the protector 150 can be positioned around a portion of the sock 140 and the curtain 110. The protector 150 can define the protector window 152.

As shown in FIG. 6, the protector window 152 can be substantially aligned with the sock window 142. In one or more arrangements, the location of the fold crease 118 can be a curtain feature of the curtain 110. As shown in FIG. 6, the CSA 100 can be configured such that inspection access to the fold crease 118 is permitted through the substantially aligned the sock window 142 and the protector window 152. Such configurations can allow visual inspection access of the fold crease 118.

Referring now to FIG. 7, another arrangement of the CSA 100 is shown. The CSA 100 can include the curtain 110, the sock 140, and the protector 150. The curtain 110 can have a roll plus one fold configuration. For example, the curtain 110 can include plus one fold 114 extending between the fold start 116 and the fold crease 118. The sock 140 can extend around portions of the curtain 110 and can include sock windows 142 defined therein. In the arrangement show in FIG. 7, the sock 140 can have two sock windows 142 at the cross section. For example, there can be two sock windows 142 on each side of the seam 144. In one or more arrangements, a portion of the interior-facing portion of the sock, including the sock window 142 on the interior-facing side of the sock 140 (the sock window 142 on the left side of FIG. 7), can be not covered by the protector 150.

In some arrangements, the curtain feature can be positioned and/or located such that visual inspection would normally be difficult or impossible. For example, the fold crease 118 can be positioned behind the seam 144 of the sock 140, shown in FIG. 7. The protector window 152 and sock windows 142 can be substantially aligned to provide inspection access by allowing a tool to measure, locate, or otherwise quantitatively inspect the curtain feature. A scale or other distance-measuring instrument can be used to measure the distance of a curtain feature relative to any other feature. For example, the distance of the fold crease 118 to an edge of each sock window 142 can be measured. A measuring instrument can be, for example, inserted through the substantially aligned protector window 152 and sock window 142 toward the fold crease 118. In some arrangements, the measuring instrument can access the curtain feature from two or more sock windows 142 and/or protector windows 152. For example, with reference to FIG. 7, a measuring scale can first be inserted through the sock window 142 on one side of the seam 144. The measuring scale can then be inserted through the protector window 152 and the sock window 142 on a second side of the seam 144. Such inspection can provide location information of the fold crease 118 within the CSA 100. In one or more arrangements, other measurement tools or instruments can be used to determine proper location and/or orientation of the fold crease 118. For example, a go/no-go gauge can be used. A "go/no-go gauge" can be any inspection tool used to check one or more characteristics of the curtain 110 against allowed tolerances.

Now that the various potential systems, devices, elements and/or components of the CSA system 100 have been described, various methods will now be described. Various possible steps of for providing a CSA system will now be described. The system includes a folded curtain airbag. The method may be applicable to the arrangements described above in relation to FIGS. 1-7, but it is understood that the method can be carried out with other suitable systems and arrangements. Moreover, the method may include other steps that are not described here, and in fact, the method is not limited to including every step described. The steps that are described here as part of the method are not limited to any particular chronological order. Indeed, some of the steps may be performed in a different order than what is described and/or at least some of the steps shown can occur simultaneously.

A sock can be positioned around at least a portion of the folded curtain. Such positioning can be performed manually or by using a tool or machine. A protector can be operatively connected to the folded curtain. The sock can define a sock window, and the protector can define a protector window. The protector window can be substantially aligned with the sock window. The substantially aligned protector window and sock window can allow inspection access to a curtain feature of the folded curtain. In one or more arrangements, the method can include inspecting the curtain feature of the folded curtain. In one or more arrangements, the method can further include determining whether the curtain feature is in a proper position.

It will be appreciated that arrangements described herein can provide numerous benefits, including one or more of the benefits mentioned herein. For example, arrangements described herein can allow for the inspection of one or more aspects of a curtain and/or sock within a curtain side airbag system. The windows in the sock and/or protector can allow for visual inspection of aspects of the curtain within a curtain side airbag system. For example, a fold location of the curtain can be inspected. In some arrangements, the curtain can have a plus one fold configuration. The windows in the sock and/or protector can allow visual or instrumented inspection of the location and/or orientation of the plus one fold. Arrangements described can allow for multiple protective components to be operatively connected to a curtain airbag, while still allowing for the inspection of the curtain airbag.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and can be used in combination with any other example, embodiment, implementation, aspect, feature, or element.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein can include sequences or series of steps or stages, elements of the methods disclosed herein can occur in various orders or concurrently. Additionally, elements of the methods disclosed herein can occur with other elements not explicitly presented and described herein. Furthermore, not all elements of the methods described herein can be required to implement a method in accordance with this disclosure. Although aspects, features, and elements are described herein in particular combinations, each aspect, feature, or element can be used independently or in various combinations with or without other aspects, features, and elements.

Although features can be described above or claimed as acting in certain combinations, one or more features of a combination can in some cases be excised from the combination, and the combination can be directed to a sub-combination or variation of a sub-combination.

The above-described aspects, examples, and implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A curtain side airbag system, comprising:
   an inflatable curtain;
   a flexible sock operatively connected to the inflatable curtain, the sock extending a substantial majority of a length of the inflatable curtain, the sock defining a sock window; and
   a substantially rigid protector operatively connected to the inflatable curtain, the protector covering a portion of an exterior side of the inflatable curtain and leaving a portion of an interior side uncovered, the protector defining a protector window opening to at least one of a side edge and a bottom edge,
   the protector window being substantially aligned with the sock window such that a portion of the sock window, a portion of the protector window, and at least one curtain feature are substantially aligned in a radial direction outward from a longitudinal axis of the inflatable curtain.

2. The curtain side airbag system of claim 1, wherein the inflatable curtain is folded with a roll plus one fold configuration.

3. The curtain side airbag system of claim 2, wherein the at least one curtain feature includes a fold crease.

4. The curtain side airbag system of claim 1, further including a plurality of anchors configured to operatively connect the curtain side airbag system to a vehicle structure.

5. The curtain side airbag system of claim 1, further including an inflator, wherein the inflator is connected in fluid communication with the inflatable curtain, and wherein the inflator is configured to selectively introduce a gas into the inflatable curtain.

6. A curtain side airbag system, comprising:
   an inflatable curtain folded with a roll plus one fold configuration;
   an inflator is connected in fluid communication with the inflatable curtain, the inflator being configured to selectively introduce a gas into the inflatable curtain;
   a flexible sock operatively connected to folded inflatable curtain, the sock extending a substantial majority of a length of the inflatable curtain, the sock including a sock seam having overlapping portions stitched together, the sock defining a sock window; and
   a substantially rigid protector operatively connected to the folded inflatable curtain, the protector covering a portion of an exterior side of the inflatable curtain and leaving a portion of an interior side uncovered, the protector defining a protector window opening to at least one of a side edge and a bottom edge of the protector,
   the protector window being substantially aligned with the sock window such that a portion of the sock window, a portion of the protector window, and a fold feature of the inflatable curtain are substantially aligned in a radial direction outward from a longitudinal axis of the inflatable curtain.

7. The curtain side airbag system of claim 6, wherein the fold feature of the inflatable curtain is a fold crease.

8. The curtain side airbag system of claim 7, wherein the fold crease allows for visual and/or instrument inspection access through the protector window.

9. The curtain side airbag system of claim 6, wherein the sock window is a first sock window, wherein the system further includes a second sock window, and wherein the first sock window and the second sock window are located on opposing sides of the sock seam.

10. A method for providing a curtain side airbag system, the system having a folded curtain configured for deployment, the method comprising:
    positioning a flexible sock around at least a portion of the folded curtain, the sock extending a substantial majority of a length of the folded curtain, the sock defining a sock window; and
    operatively connecting a substantially rigid protector to the folded curtain, the protector covering a portion of an exterior side of the inflatable curtain and leaving a portion of an interior side uncovered, the protector defining a protector window opening to at least one of a side edge and a bottom edge of the protector,
    the protector window being substantially aligned with the sock window such that a portion of the sock window, a portion of the protector window, and a curtain feature of the folded curtain are is allowed through the substantially aligned in a radial direction outward from a longitudinal axis of the folded curtain.

11. The method of claim 10, further including inspecting the curtain feature of the folded curtain.

12. The method of claim 11, further including determining whether the curtain feature is in a proper position.

* * * * *